US012770299B2

(12) United States Patent
Kothandaraman et al.

(10) Patent No.: US 12,770,299 B2
(45) Date of Patent: Oct. 20, 2026

(54) SUBJECT-ACTION IMAGE GENERATION USING STEPWISE INFERENCE AND FREQUENCY GUIDANCE

(71) Applicant: ADOBE INC., San Jose, CA (US)

(72) Inventors: Divya Kothandaraman, College Park, MD (US); Kuldeep Kulkarni, Bangalore (IN); Balaji Vasan Srinivasan, Bangalore (IN); Aniruddha Mahapatra, Kolkata (IN); Sumit Shekhar, Noida (IN); Dinesh Manocha, Bethesda, MD (US)

(73) Assignee: ADOBE INC., San Jose, CA (US)

( * ) Notice: Subject to any disclaimer, the term of this patent is extended or adjusted under 35 U.S.C. 154(b) by 147 days.

(21) Appl. No.: 18/757,641

(22) Filed: Jun. 28, 2024

(65) Prior Publication Data

US 2026/0004469 A1 Jan. 1, 2026

(51) Int. Cl.
*G06T 11/00* (2026.01)

(52) U.S. Cl.
CPC .................................... *G06T 11/00* (2013.01)

(58) Field of Classification Search
CPC ....... G06T 11/001; G06T 15/04; G06T 17/20; G06T 11/00; G06T 11/10; G06T 11/26
See application file for complete search history.

(56) References Cited

U.S. PATENT DOCUMENTS

2025/0005829 A1* 1/2025 Kim ........................ G06T 11/60
2025/0005901 A1* 1/2025 Cha ........................ G06V 20/70
2025/0095222 A1* 3/2025 Sugden ................. G06F 3/0482

OTHER PUBLICATIONS

1Feng, et al., "Training-Free Structured Diffusion Guidance for Compositional Text-to-Image Synthesis", arXiv preprint arXiv:2212.05032v3 [cs.CV] Feb. 28, 2023, 21, pages.
2Ho et al, "Classifier-Free Diffusion Guidance", arXiv preprint arXiv:2207.12598v1 [cs.LG] Jul. 26, 2022, 14 pages.
3Isola, et al., "Image-to-Image Translation with Conditional Adversarial Networks", arXiv preprint arXiv:1611.07004v3 [cs.CV] Nov. 26, 2018, 17 pages.
4Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.
5Ramesh, et al., Hierarchical Text-Conditional Image Generation with CLIP Latents, arXiv preprint arXiv:2204.06125v1 [cs.CV] Apr. 13, 2022, 27 pages.
6Zhu, et al., "Toward Multimodal Image-to-Image Translation", arXiv preprint arXiv:1711.11586v4 [cs.CV] Oct. 24, 2018, 12 pages.
7Vaswani, et al., "Attention is All You Need", arXiv preprint arXiv:1706.03762v5 [cs.CL] Dec. 6, 2017, 15 pages.

* cited by examiner

*Primary Examiner* — Michelle Chin
(74) *Attorney, Agent, or Firm* — F. CHAU & ASSOCIATES, LLC

(57) ABSTRACT

A method, apparatus, non-transitory computer readable medium, and system for generating images includes obtaining an image generation prompt and a reference prompt. The image generation prompt includes a first element and a second element and the reference prompt includes the second element. Embodiments then generate, using an image generation model, an intermediate image based on the reference prompt. Subsequently, embodiments generate, using the image generation model, a synthetic image including the first element and the second element based on the intermediate image and the image generation prompt.

19 Claims, 10 Drawing Sheets

SUBJECT-ACTION IMAGE GENERATION USING STEPWISE INFERENCE AND FREQUENCY GUIDANCE

BACKGROUND

The following relates generally to image processing, and more specifically to image generation. Image processing is a type of data processing that involves the manipulation of an image to get the desired output, typically utilizing specialized algorithms and techniques. Image processing is used to perform operations on an image to enhance its quality or to extract useful information from it. This process usually comprises a series of steps that includes the importation of the image, its analysis, manipulation to enhance features or remove noise, and the eventual output of the enhanced image or salient information it contains.

Image generation is a type of image processing that involves the creation of synthetic images. Recently, generative artificial intelligence (AI) models have been developed to generate realistic images. One such model is the Denoising Diffusion Probabilistic Model (DDPM). DDPMs generate samples by transforming an initial random noise distribution into a data distribution over a series of time steps. In some cases, a DDPM can be conditioned on a text description, such that the diffusion process generates images that match the text. In some cases, additional conditioning beyond the text description may be applied to generate images that conform to a particular pose or lighting, for example.

SUMMARY

Embodiments of the inventive concepts described herein include systems and methods for generating an image that depicts a subject from a first image performing an action from a second image. Embodiments include an image generation model configured generate a synthetic image in multiple inference phases. The image generation model performs a first generation that is guided by a reference prompt describing an action to produce an intermediate image. Then, from this intermediate image, the image generation model performs a second generation, guided by an image generation prompt that describes both a subject and the action, to produce the synthetic image.

In some embodiments, the image generation is based on a denoising diffusion process. For example, the first generation may be guided by the reference prompt for K-iterations of a diffusion model, where K is a predetermined number. The second generation may then be guided by the image generation prompt for (T-K) iterations, where T is the total number of diffusion iterations. In some cases, embodiments receive a source image depicting the subject and a reference image depicting the action. Embodiments may then perform a Fourier transform on the source image and the reference image to obtain amplitude information and phase information for each image. According to some aspects, embodiments further guide both the first generation and the second generation using amplitude information from the source image and phase information from the reference image.

A method, apparatus, non-transitory computer readable medium, and system for image generation are described. One or more aspects of the method, apparatus, non-transitory computer readable medium, and system include obtaining an image generation prompt and a reference prompt, wherein the image generation prompt includes a first element and a second element, and the reference prompt includes the second element; generating, using an image generation model, an intermediate image based on the reference prompt; and generating, using the image generation model, a synthetic image including the first element and the second element based on the intermediate image and the image generation prompt.

A method, apparatus, non-transitory computer readable medium, and system for image generation are described. One or more aspects of the method, apparatus, non-transitory computer readable medium, and system include obtaining a training set including a source image depicting a first element and a reference image depicting a second element and training, using the training set, an image generation model to generate a synthetic image including the first element and the second element based on an image generation prompt that includes the first element and the second element and a reference prompt that includes the second element.

An apparatus, system, and method for image generation are described. One or more aspects of the apparatus, system, and method include at least one processor; at least one memory including instructions executable by the at least one processor; and an image generation model comprising parameters stored in the at least one memory and configured to generate a synthetic image including a first element and a second element based on an image generation prompt that includes the first element and the second element and a reference prompt that includes the second element.

DETAILED DESCRIPTION

Figure 1:
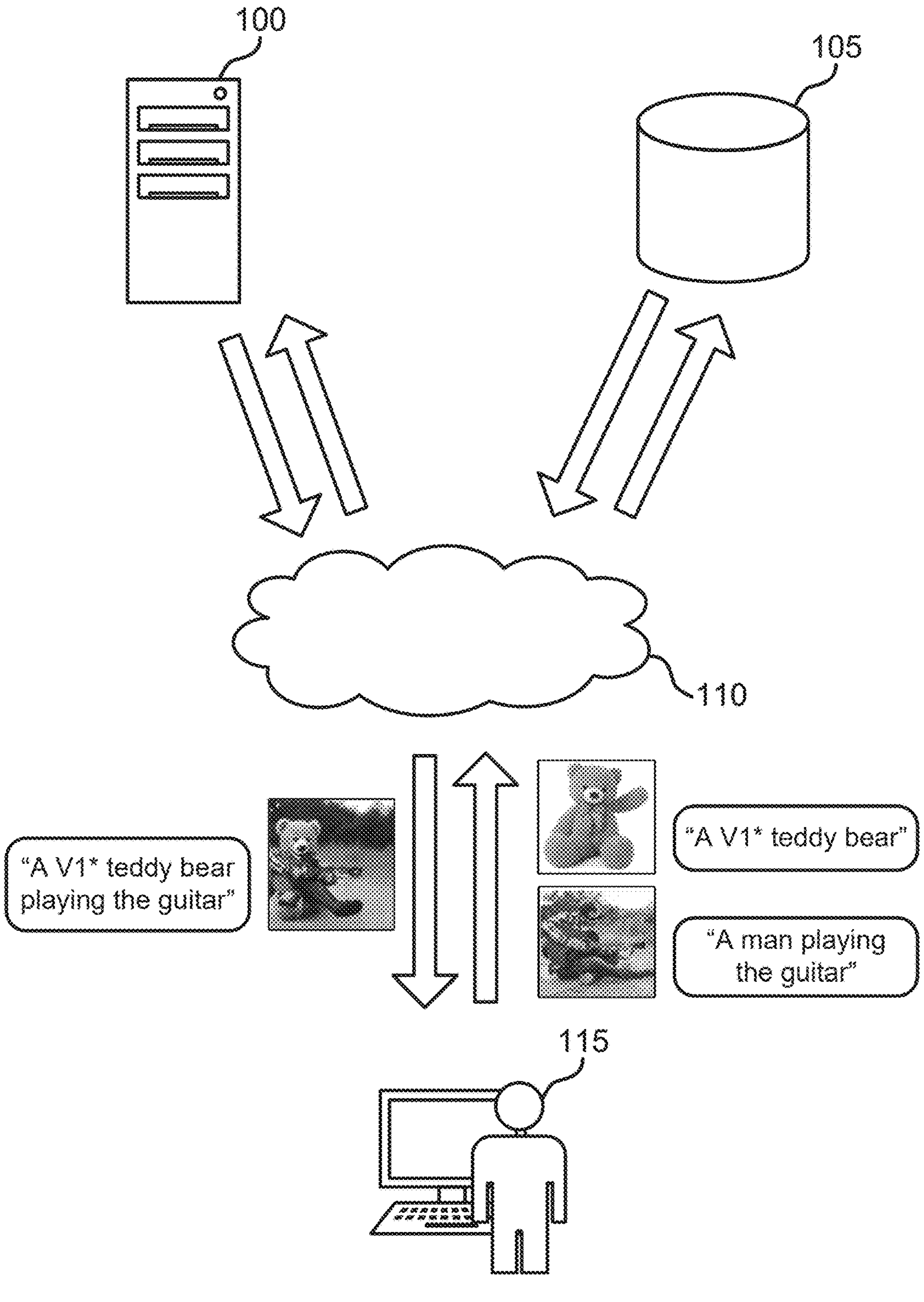
FIG. 1 shows an example of an image generation system according to aspects of the present disclosure.

Image generation is frequently used in creative workflows. Historically, users would rely on manual techniques and drawing software to create visual content. The advent of machine learning (ML) has enabled new workflows that automate the image creation process.

ML is a field of data processing that focuses on building algorithms capable of learning from and making predictions or decisions based on data. It includes a variety of techniques, ranging from simple linear regression to complex neural networks, and plays a significant role in automating and optimizing tasks that would otherwise require extensive human intervention.

Generative models in ML are algorithms designed to generate new data samples that resemble a given dataset. Generative models are used in various fields, including image generation. They work by learning patterns, features, and distributions from a dataset and then using this understanding to produce new, original outputs.

In some cases, users may wish to ensure a certain pose or action is included in the generated image. Conventional methods in motion transfer often rely on detailed pose information, like the Skinned Multi-Person Linear Model (SMPL) or keypoints, during training in a supervised or unsupervised manner. These systems are designed to transfer actions from a driving image or video to a subject in a source image, but they typically struggle with generalizing to diverse image pairs and often require extensive datasets for effective training. Similarly, others have advanced research in exemplar image animation by transferring motion characteristics from a driving video to a source image by mapping motion at the frame level. These approaches, however, are limited to specific domains such as human figures and necessitate additional annotations like keypoints or 2D/3D poses, or the computation of optical flow.

Some other conventional approaches utilize diffusion models for controlled image generation. For example, some methods have enabled personalized text-guided image editing to introduce specific subjects into a model by fine-tuning the diffusion process based on text inputs describing various actions. While these methods can generate images where the subject performs an action, they do not offer precise control over how the subject performs the action in the image. For example, they might allow a dog to be shown drinking from a mug but won't specify the exact pose of the dog.

Embodiments of the present disclosure enhance existing subject-action transfer methods in image generation by enabling the creation of a synthetic image that includes an arbitrary subject performing an arbitrary action, without the need for additional information such as keypoints or pose data. Embodiments eliminate the need for an extensive training phase with large datasets to learn a specific subject or action. Instead, they fine-tune an image generation model using just a single pair of images-one representing the subject and the other depicting the action. Embodiments then perform stepwise inference by guiding the generation up to an intermediate timestep using a reference prompt describing the action, and then guiding the generation from the intermediate timestep using an image generation prompt describing both the subject and the action. Some embodiments further enhance the fidelity of the synthetic image to the subject's identity and the action's form by utilizing amplitude information from the subject's image and phase information from the action's image during the generation process An image generation system is described with reference to FIGS. 1-3. Methods for generating synthetic images including a specific subject and action are described with reference to FIGS. 4-7. Training methods are described with reference to FIGS. 8-9. A computing device configurable to implement an image generation apparatus is described with reference to FIG. 10.

Image Generation System

FIG. 1 shows an example of an image generation system according to aspects of the present disclosure. The example shown includes image generation apparatus 100, database 105, network 110, and user 115. In one example, a user provides an image of a subject (a "source image") and a caption of the source image, as well as an image of an action (a "reference image") and a caption of the reference image. The user may do so via a user interface, such as a graphical user interface (GUI). Then, the image generation apparatus 100 processes the images and their captions to generate a synthetic image of the subject performing the action. According to some aspects, the image generation apparatus 100 may generate a caption associated with the synthetic image. However, in at least some embodiments, the user provides the generation caption along with the source image, source caption, reference image, and reference caption.

Embodiments of image generation apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 is configured to store data used by the image generation, which may include machine learning model parameters, training data, stock images, image labels, and generated images. A database is an organized collection of data. For example, a database stores data in a specified format known as a schema. A database may be structured as a single database, a distributed database, multiple distributed databases, or an emergency backup database. In some cases, a database controller may manage data storage and processing in database. In some cases, user 115 interacts with the database controller. In other cases, the database controller may operate automatically without user interaction.

Network 110 facilitates the transfer of information between image generation apparatus 100, database 105, and user 115. A cloud is a computer network configured to provide on-demand availability of computer system resources, such as data storage and computing power. In some examples, the cloud provides resources without active management by user 115. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, image generation apparatus 100 obtains an image generation prompt and a reference prompt, where the image generation prompt includes a first element and a second element, and the reference prompt includes the second element. In some aspects, the first element includes a subject and the second element an action performed by the subject. In some aspects, the image generation prompt includes a nonce token corresponding to the first element.

According to some aspects, image generation apparatus 100 obtains a training set including a source image depicting a first element and a reference image depicting a second element. In some aspects, the image generation prompt includes a nonce token corresponding to the first element. In some examples, image generation apparatus 100 obtains a pre-trained image generation model, where training the image generation model includes finetuning the pre-trained image generation model based on the source image and the reference image. Additional detail regarding training is provided with reference to FIGS. 8-9. Image generation apparatus 100 is an example of, or includes aspects of, the image generation model described with reference to FIG. 2.

Figure 2:
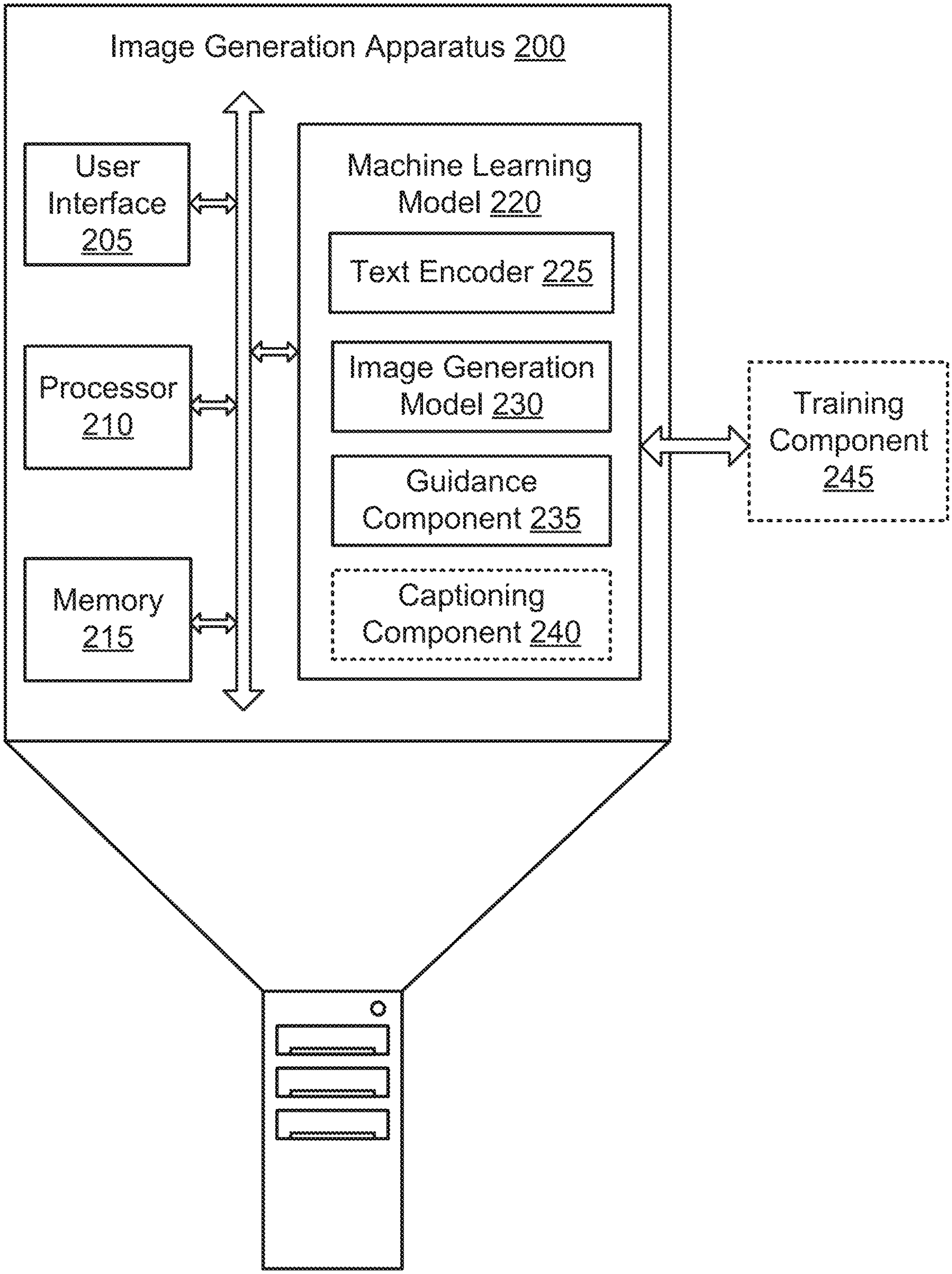
FIG. 2 shows an example of an image generation apparatus according to aspects of the present disclosure.

FIG. 2 shows an example of an image generation apparatus 200 according to aspects of the present disclosure. The example shown includes image generation apparatus 200, user interface 205, processor 210, memory 215, machine learning model 220, and training component 245. Image generation apparatus 200 is an example of, or includes aspects of, the corresponding element described with reference to FIG. 1.

A user interface enables a user to interact with a device. In some embodiments, user interface 205 may include an audio device, such as an external speaker system, an external display device such as a display screen, or an input device (e.g., remote control device interfaced with the user interface 205 directly or through an IO controller module). In some cases, user interface 205 may include a graphical user interface (GUI). For example, the GUI may be presented as a component of a software application or a web application.

A processor 210 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor 210 is configured to operate a memory array using a memory controller. In other cases, a memory controller is integrated into the processor 210. In some cases, processor 210 is configured to execute computer-readable instructions stored in memory 215 to perform various functions. In some embodiments, processor 210 includes special purpose components for modem processing, baseband processing, digital signal processing, or transmission processing.

Memory 215 stores data used during operation of image generation apparatus 200. Memory 215 may, for example, pull data from a database as described in FIG. 1. Examples of a memory device include random access memory (RAM), read-only memory (ROM), or a hard disk. Examples of memory devices include solid state memory and a hard disk drive. In some examples, memory 215 is used to store computer-readable, computer-executable software including instructions that, when executed, cause processor 210 to perform various functions described herein. In some cases, memory 215 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 215 store information in the form of a logical state.

In the embodiment illustrated by FIG. 2, machine learning model 220 includes text encoder 225, image generation model 230, guidance component 235, and captioning component 240. These subcomponents may be implemented with an artificial neural network (ANN) architecture. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Text encoder 225 is configured to generate an embedding from an input text. An embedding, or embedding vector, is a numerical representation that captures the semantic meaning of the text. The text encoder processes the input text and converts it into a dense vector of fixed size. This vector consists of floating-point numbers that represent various features of the text, making the text understandable to the machine learning models. The embedding helps the model to recognize and utilize textual information effectively, enabling it to respond to the specific details and nuances described in the text. In some embodiments, the text encoder 225 includes or is based on the CLIP text encoder.

Embodiments of the text encoder are based on a transformer architecture. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some aspects, text encoder 225 is configured to generate a text embedding of the image generation prompt and the reference prompt input into image generation apparatus 200. Text encoder 225 is an example of, or includes aspects of, the corresponding element described with reference to FIG. 3.

Image generation model 230 is configured to generate a synthetic image. According to some aspects, image generation model 230 processes two input text prompts: a reference prompt that includes an action, and an image generation prompt that includes a subject and the same action from reference prompt. The generated synthetic image then depicts the content from the image generation prompt: the subject performing the action. Embodiments of image generation model 230 include a diffusion model, which is described in detail with reference to FIG. 3.

According to some aspects, image generation model 230 generates an intermediate image based on the reference prompt. In some examples, image generation model 230 generates a synthetic image including a first element and a second element based on the intermediate image and the image generation prompt. In some examples, image generation model 230 performs a diffusion process up to an intermediate timestep. In some examples, image generation model 230 performs a diffusion process starting from an intermediate timestep. Image generation model 230 is an example of, or includes aspects of, the corresponding element described with reference to FIG. 8.

Guidance component 235 is configured to perform a Fourier transform on an input image. According to some aspects, the Fourier transform generates amplitude and phase (e.g., frequency phase) information from the image. The guidance component 235 may input the amplitude and the phase information as guidance to image generation model 230 to influence the generation of the synthetic image.

According to some aspects, guidance component 235 obtains a source image depicting the first element. The first element may be, for example, a subject or actor. In some examples, guidance component 235 generates an amplitude guidance based on the source image, where the synthetic image is generated based on the phase guidance. In some examples, guidance component 235 obtains a reference image depicting the second element. The second element may be, for example, an action. In some examples, guidance component 235 generates a phase guidance based on the reference image, where the intermediate image is generated based on the phase guidance.

According to some aspects, guidance component 235 generates an amplitude guidance based on the source image. In some examples, guidance component 235 computes a phase guidance based on the reference image, where the generation of the synthetic image is based on the phase guidance and the amplitude guidance. Guidance component 235 is an example of, or includes aspects of, the corresponding element described with reference to FIG. 4.

Some embodiments of image generation apparatus 200 include a captioning component 240. The captioning component 240 may be an image-to-text model configured to generate a caption or label for an input image. For example, the captioning component 240 may include a CLIP model, a BLIP-2 model, a LLaVA caption model, or the like. In some embodiments, the captioning component 240 may generate a source caption for an input source image, a reference caption for an input reference image, an image generation caption for a synthetic image generated by image generation model 230, or some combination thereof. Captioning component 240 may be implemented on an apparatus different from image generation apparatus 200.

Training component 240 is configured to update parameters of machine learning model 220 during a fine-tuning phase. For example, training component 240 may finetune image generation model 230 using a source-reference pair, where the source-reference pair includes a source image and a source caption, and a reference image and a reference caption. Detail regarding training is provided with reference to FIGS. 8-9.

According to some aspects, training component 245 trains, using a training set including a source image depicting a first element and a reference image depicting a second element, an image generation model 230 to generate a synthetic image including the first element and the second element based on an image generation prompt that includes the first element and the second element and a reference prompt that includes the second element. In some aspects, the training set includes a source prompt describing the source image and a reference prompt describing the reference image. In some examples, training component 245 computes a first diffusion loss term based on the source image. In some examples, training component 245 computes a second diffusion loss term based on the reference image. In some examples, training component 245 updates parameters of the image generation model 230 based on the first diffusion loss term and the second diffusion loss term. Training component 245 is an example of, or includes aspects of, the corresponding element described with reference to FIG. 8.

Figure 3:
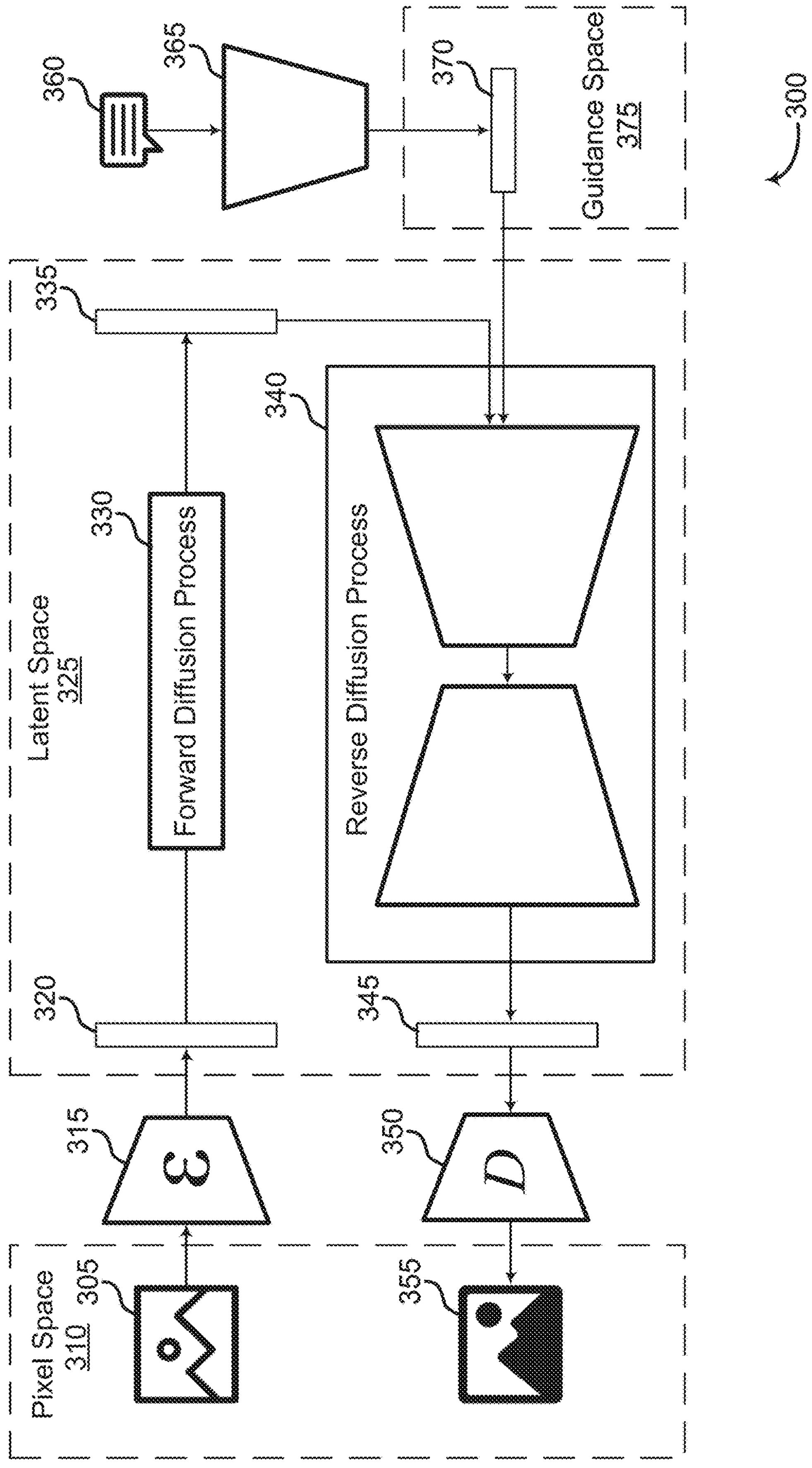
FIG. 3 shows an example of an image generation model according to aspects of the present disclosure.

FIG. 3 shows an example of an image generation model according to aspects of the present disclosure. The example shown includes guided latent diffusion model 300, original image 305, pixel space 310, image encoder 315, original image features 320, latent space 325, forward diffusion process 330, noisy features 335, reverse diffusion process 340, denoised image features 345, image decoder 350, output image 355, text prompt 360, text encoder 365, guidance features 370, and guidance space 375. Text encoder 365 is an example of, or includes aspects of, the corresponding element described with reference to FIG. 2.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1}|x_t) := N(x_{t-1}; \mu_\theta(x_t, t), \Sigma_\theta(x_t, t)). \quad (1)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1}|x_t), \quad (2)$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At inference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood—log $p_\theta(x)$ of the training data. The training system then updates parameters of the model based on the comparison. For example, parameters of a U-Net may be updated using gradient descent. Time-dependent parameters of the Gaussian transitions can also be learned.

Figure 4:
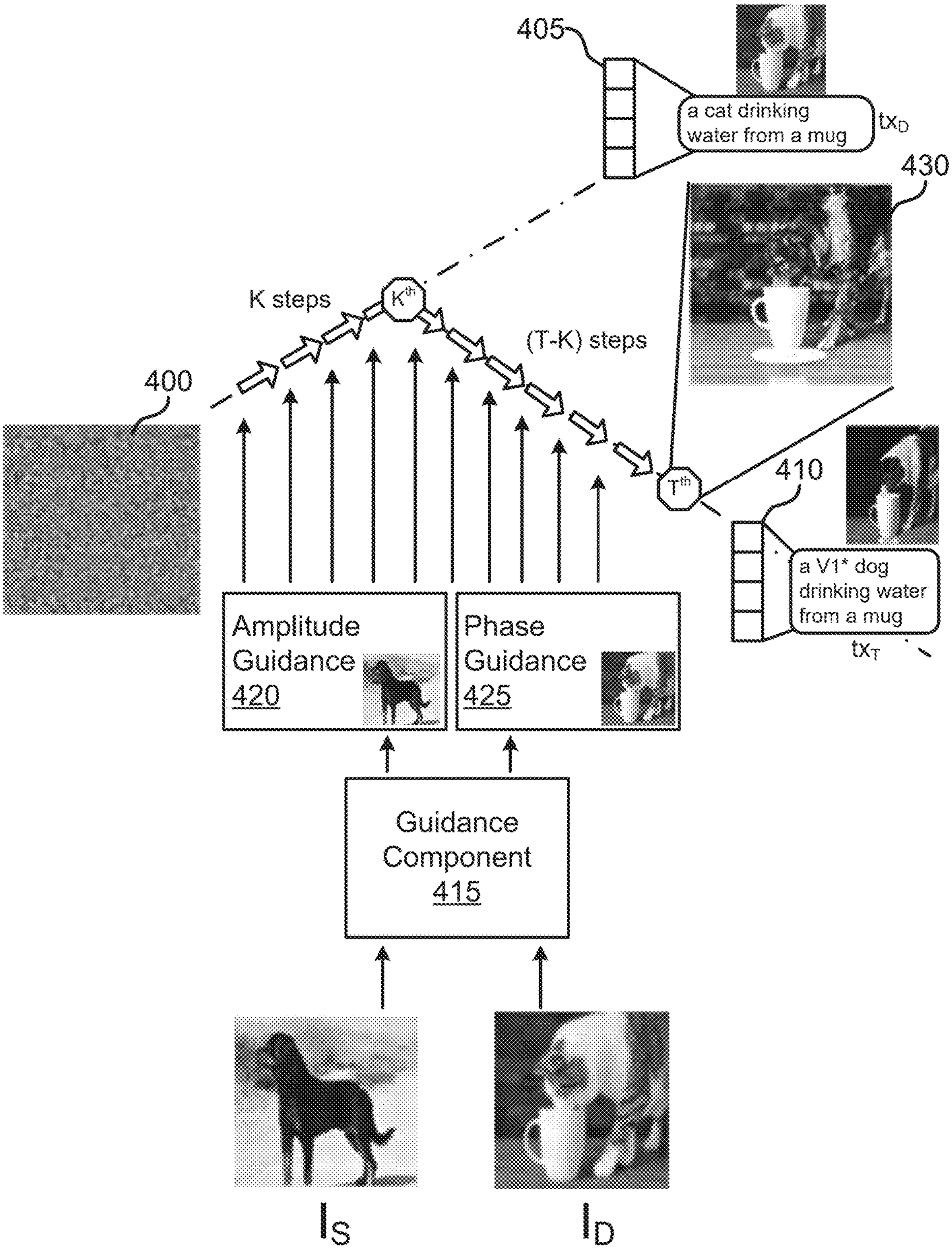
FIG. 4 shows an example of an stepwise inference pipeline according to aspects of the present disclosure.

FIG. 4 shows an example of a stepwise inference pipeline according to aspects of the present disclosure. The example shown includes noise input 400, reference prompt embedding 405, image generation prompt embedding 410, guidance component 415, amplitude guidance 420, phase guidance 425, and synthetic image 430. Guidance component 415 is an example of, or includes aspects of, the corresponding element described with reference to FIG. 2. Synthetic image 430 is an example of, or includes aspects of, the corresponding element described with reference to FIG. 7.

According to some aspects, a source text description which describes a source image may be denoted as $tx_S$ and a reference text description describing a reference image may be denoted as $tx_D$. The source image may depict a subject, and the reference image may depict an action (sometimes referred to as a driving action, hence the 'D' in the notation). An image generation description $tx_T$ may be a modified combination of $tx_S$ and $tx_D$. For example, if $tx_s$ is "a V1*dog" and $tx_D$ is "a cat drinking water from a mug," then the image generation description $tx_T$ may be "a V1*dog drinking water from a mug." A text encoder such as the one described with reference to FIG. 2 may encode $tx_D$ to form reference prompt embedding 405 and may encode the image generation description $tx_T$ to form image generation prompt embedding 410. Before inference begins, embodiments may finetune a pretrained image generation model on an image pair including the source image $I_S$ and the reference image $I_D$ using their respective captions $tx_S$ and $tx_D$. Additional detail regarding training is provided with reference to FIGS. 8-9.

Embodiments perform stepwise inference by moving towards the reference image manifold (e.g., a point in space defined by reference prompt embedding 405) for a threshold number of steps, and then by moving towards the synthetic image manifold (e.g., a point in space defined by image generation prompt embedding 410) for the remaining number of steps. According to some aspects, moving in the direction of the reference image manifold (e.g., towards reference prompt embedding 405) will ensure the reconstruction of the reference action accurately. However, continued movement in this direction over many denoising iterations will cause the resulting generated image to include the subject of the reference image and not the subject from the source image. Similarly, moving in a direction corresponding to the source image manifold will ensure the reconstruction of the source subject accurately, but will also be biased to any poses or actions depicted in the source image, and therefore the resulting generated image will not include the action from the reference image.

In some cases, the point in space defined by image generation prompt embedding 410 does not contain the desired target image. In other words, naïve diffusion using only the image generation description $tx_T$ as guidance will be unable to generate the desired target image. This is because the pretrained image generation model has a very wide knowledge distribution, and is inclined to generate a wide variety of images that are not fully conformant with the specific characteristics of the source subject nor the reference action. For example, the pretrained image generation model may synthesize an image that does not include the same dog from $I_S$, and does not depict the dog drinking the water in the same way shown by $I_D$.

Accordingly, embodiments implement a stepwise inference strategy. In an embodiment, an image generation model may begin by denoising the noise input 400 using reference prompt embedding 405 as guidance features for K iterations. This produces an intermediate image (or, in a latent space, an intermediate feature vector). Then, embodiments "change directions" by denoising the intermediate image for a remaining number of iterations (Total iterations—K) using image generation prompt embedding 410. This process causes the image generation to proceed first in the direction of the reference image manifold and establish some structure corresponding to the reference action. Then, the image generation proceeds in the direction of the synthetic image manifold, refining the intermediate features to better represent the source subject. After the denoising is completed, i.e., after T iterations, the denoised features are decoded to produce synthetic image 430. According to some aspects, synthetic image 430 includes the subject described by $tx_S$ performing the action described by $tx_D$.

In some cases, the updates in each iteration of a generative reverse diffusion process are relatively small. This is leveraged by embodiments of the present disclosure to establish a strong prior representing the driving action from a reference image, and then using this prior in the remaining denoising iterations to generate the subject from a source image. It can be much more difficult to modify a pose/action than it is to modify the characteristics or the identity of a subject. Accordingly, embodiments establish the action prior first, before denoising in the direction of image generation prompt embedding 410 to obtain the subject identity.

Some embodiments further condition the image generation process using frequency guidance. The frequency domain representation of an image provides rich information about the image, including detail and structure. The amplitude of the 2D spatial Fourier transform of an image is representative of the different intensities of an image, and includes information about the geometrical structure of the features in an image. This corresponds to details and local contrasts within an image. The phase of the 2D spatial Fourier transform of an image represents the location of these features. It is possible to reconstruct the grayscale component of an image using just its phase information.

The amplitude and phase information helps in reconstructing the colors, attributes, texture, and identity of the scene in an image. The amplitude information of the source image may be used therefore to further guide the image generation process to ensure faithful reconstruction of the subject. The phase information of the reference image may similarly be used to guide the image generation process to ensure faithful reconstruction of the action. According to some aspects, the guidance component 415 generates both amplitude guidance 420 and phase guidance 425 and applies both to the iterations of the generation process. Some embodiments may apply both guidances to every iteration, though embodiments are not necessarily limited thereto, and either guidance may be applied to a subset of the iterations. The combined guidance may be used to adjust the denoising vector according to Equation 3:

$$\epsilon'(z_t, t) = \epsilon(z_t, t) + s(t) \times \nabla_{zt} G \tag{3}$$

where $z_t$ is the denoised latent features at timestep (i.e., iteration) t, $\nabla_{zt}G$ is the gradient of the guidance function, and s(t) is a scheduled strength of the guidance for each sampling step. According to some aspects, rather than adjusting the noise e predicted by the image generation model, embodiments my directly modify the computed latents using a guidance function as described in Equation 4:

$$\tilde{z}_t = z_t - s_a * G_a - s_p * G_p \tag{4}$$

where $s_\alpha$ and $s_p$ are the scaling factors for the frequency amplitude guidance and the frequency phase guidance $G_\alpha$ and $G_p$, respectively. $G_\alpha$ and $G_p$ may be defined using Equation 5:

$$G_a = iF(Mag(F(f_s))),\ G_p = iF(Ang(F(z_t))) \quad (5)$$

where $f_s$ is the latent space representation of the source image, iF and F denote the operations of the inverse Fast Fourier transform (iFFT) and the Fast Fourier Transform (FFT), respectively, and Mag and Ang denote the magnitude and the angle of the Fourier transform. According to some aspects, $G_\alpha$ drive the image generation towards the source subject at each step of the sampling, and $G_p$ reinforces the driving pose at each step of the sampling and prevents any distortion in pose that may be caused by $G_\alpha$.

Accordingly, embodiments herein describe an apparatus for image generation. One or more aspects of the apparatus include at least one processor; at least one memory including instructions executable by the at least one processor; and an image generation model comprising parameters stored in the at least one memory and configured to generate a synthetic image including a first element and a second element based on an image generation prompt that includes the first element and the second element and a reference prompt that includes the second element.

In some aspects, the image generation model comprises a diffusion model. In some aspects, the image generation model is configured to generate an intermediate image by performing a diffusion process up to an intermediate timestep, and to generate the synthetic image by performing a diffusion process starting from the intermediate timestep.

Some examples of the apparatus, system, and method further include a text encoder configured to generate a text embedding of the image generation prompt and the reference prompt. Some examples of the apparatus, system, and method further include a guidance component configured to generate a phase guidance and an amplitude guidance. In some aspects, the image generation prompt comprises a nonce token corresponding to the first element.

Generating Images

Figure 5:
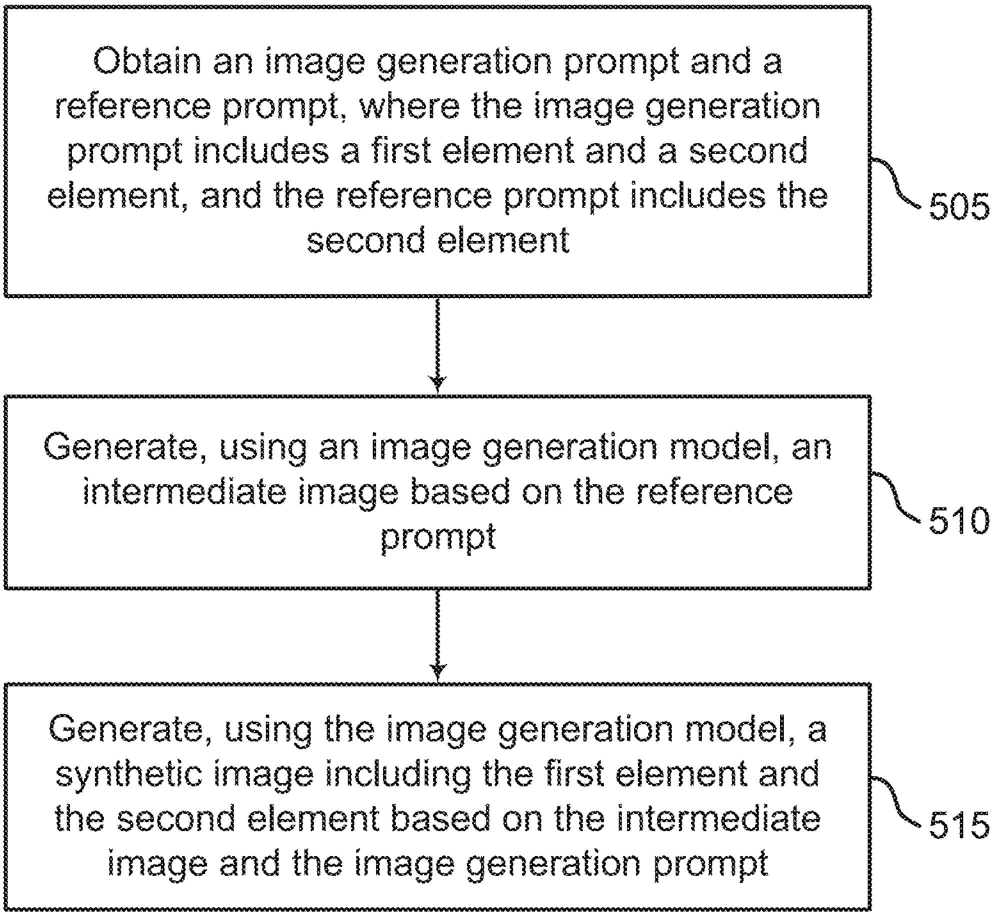
FIG. 5 shows an example of a method for generating a synthetic image according to aspects of the present disclosure.

FIG. 5 shows an example of a method 500 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains an image generation prompt and a reference prompt, where the image generation prompt includes a first element and a second element, and the reference prompt includes the second element. In some cases, the operations of this step refer to, or may be performed by, a user interface as described with reference to FIG. 2. The first element may be, for example, a subject or actor. The second element may be, for example, an action or pose. In an example case, a user inputs the image generation prompt and the reference prompt by entering the text of each prompt into a GUI. In some cases, the user may also provide a source image depicting the first element and a reference image depicting the second element. The user may choose the source image and the reference image from a stock database, or may upload it from their personal device.

At operation 510, the system generates, using an image generation model, an intermediate image based on the reference prompt. In some cases, the operations of this step refer to, or may be performed by, an image generation model as described with reference to FIGS. 2 and 8. According to some aspects, the intermediate image represents a partial denoising of a pure noise sample. The intermediate image may be in the form of latent features. Additional detail regarding the denoising process is provided with reference to FIGS. 3-4.

At operation 515, the system generates, using the image generation model, a synthetic image including the first element and the second element based on the intermediate image and the image generation prompt. In some cases, the operations of this step refer to, or may be performed by, an image generation model as described with reference to FIGS. 2 and 8. The synthetic image depicts the subject performing the action or pose as specified in the image generation prompt. Additional detail regarding how this is achieved is provided with reference to FIG. 4.

Figure 6:
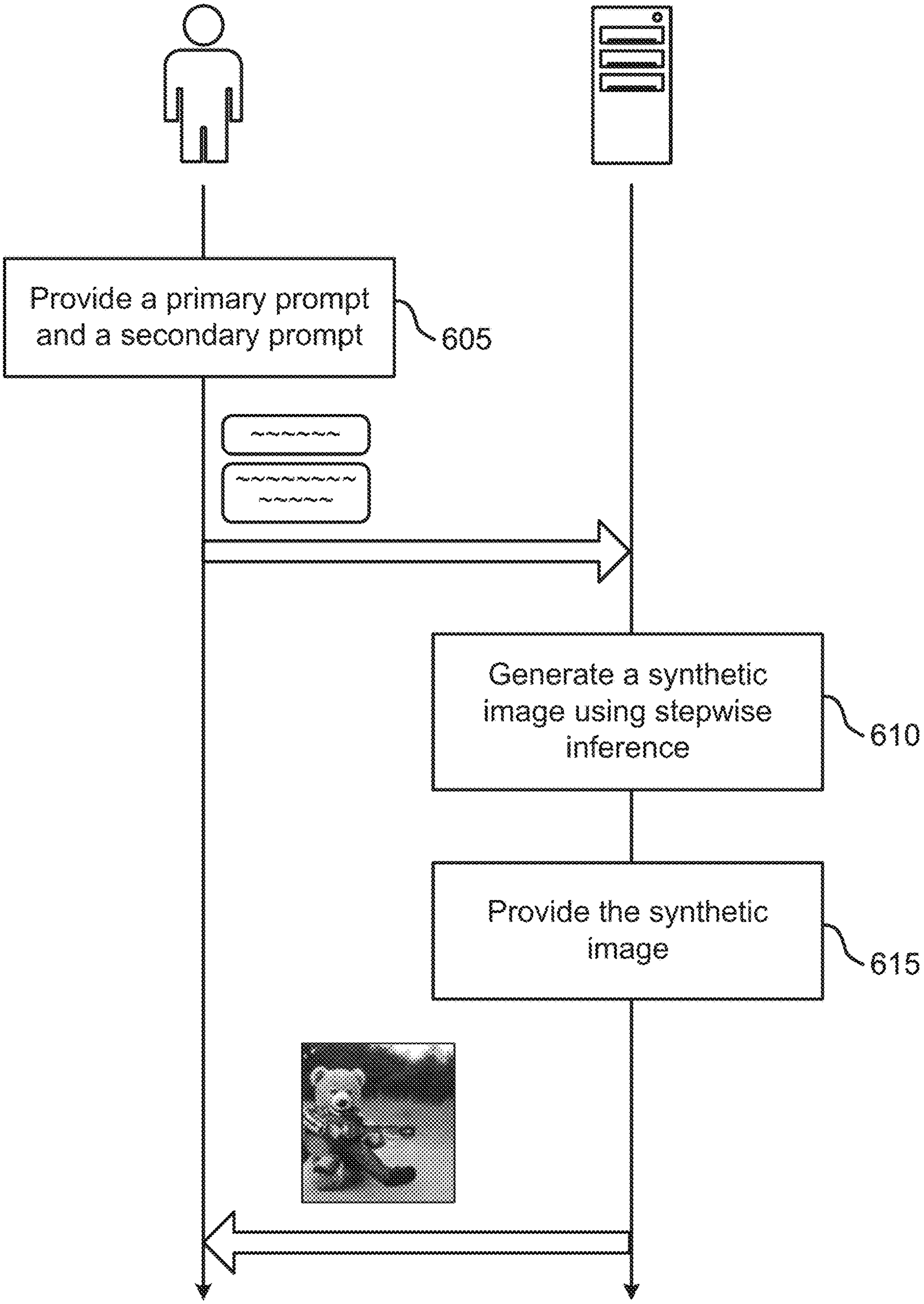
FIG. 6 shows an example of a method for providing a synthetic image to a user according to aspects of the present disclosure.

FIG. 6 shows an example of a method 600 for providing a synthetic image to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides a primary prompt and a secondary prompt. In this example, the primary prompt may include a source caption describing a subject, a source image depicting the subject, or a combination thereof. The secondary prompt may include a reference caption describing an action, a reference image depicting the action, or a combination thereof.

At operation 610, the system generates a synthetic image using stepwise inference. The system may, for example, combine the primary prompt and the secondary prompt to form an image generation prompt describing a subject and an action. The system may then perform stepwise inference to generate a synthetic image that depicts the subject performing the action. Additional detail regarding this process is described with reference to FIG. 4.

At operation 615, the system provides the synthetic image. The system may do so, for example, via a user interface as described with reference to FIG. 2. In some embodiments, the system may further provide the image generation prompt as a label for the synthetic image.

The system described herein can be operated in several ways, as illustrated through the various examples in the Figures. In one mode, a user may input a source image and caption, a reference image and caption, along with an image generation prompt, allowing the system to generate a synthetic image. Alternatively, the user could provide just the image generation prompt and the reference caption, from which the system then creates the synthetic image. Another approach allows the user to submit a first image marked as the "subject" and a second image marked as the "action." The system can generate captions for both images using a captioning component and subsequently produce the synthetic image based on these inputs. Each method leverages the stepwise inference process detailed in FIG. 4, and generates a synthetic image that accurately depicts a specified subject performing a designated action, utilizing various input configurations.

Figure 7:
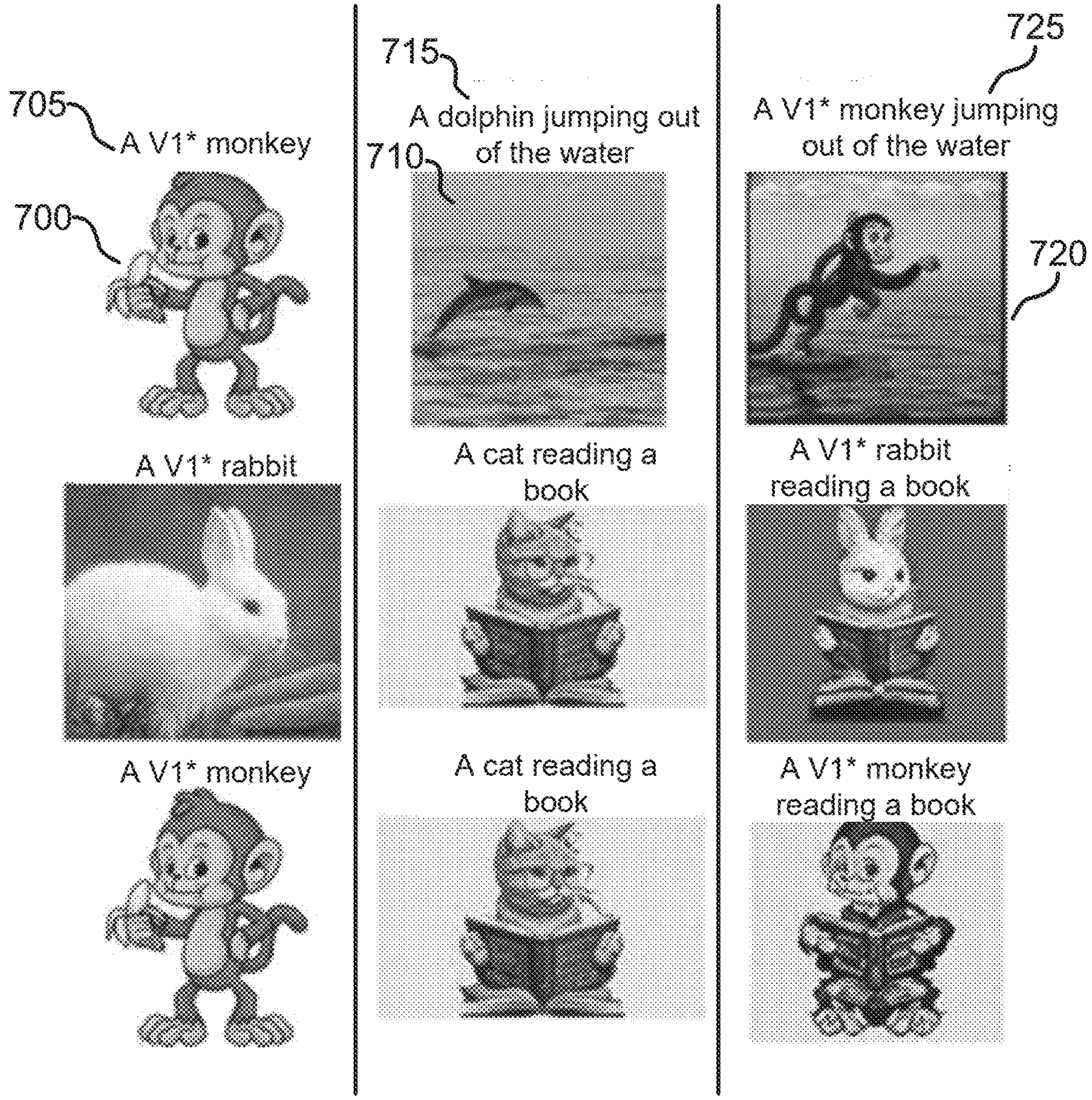
FIG. 7 shows an example of generated images according to aspects of the present disclosure.

FIG. 7 shows an example of generated images according to aspects of the present disclosure. The example shown includes source image 700, source caption 705, reference image 710, reference caption 715, synthetic image 720, and image generation caption 725. Source image 700 is an example of, or includes aspects of, the corresponding element described with reference to FIG. 8.

In this example, the first column includes examples of source images and source captions, which respectively depict and describe a subject. The second column includes examples of reference images and reference captions, which respectively depict and describe an action. The final column displays the results of inputting the source information and the reference information into the system described herein. For example, the synthetic image 720 depicts the monkey from the first column performing the action from the second column, which is "jumping out of the water."

Accordingly, embodiments include a method for image generation. One or more aspects of the method include obtaining an image generation prompt and a reference prompt, wherein the image generation prompt includes a first element and a second element, and the reference prompt includes the second element; generating, using an image generation model, an intermediate image based on the reference prompt; and generating, using the image generation model, a synthetic image including the first element and the second element based on the intermediate image and the image generation prompt.

In some aspects, the first element comprises a subject and the second element an action performed by the subject. In some aspects, the image generation prompt comprises a nonce token corresponding to the first element. The nonce token may appear as, for example, "V1*," such as "a V1*teddy bear."

Some examples of the method, apparatus, non-transitory computer readable medium, and system further include obtaining a source image depicting the first element. Some examples further include generating an amplitude guidance based on the source image, wherein the synthetic image is generated based on the phase guidance. Some examples of the method, apparatus, non-transitory computer readable medium, and system further include obtaining a reference image depicting the second element. Some examples further include generating a phase guidance based on the reference image, wherein the intermediate image is generated based on the phase guidance.

Some examples of the method, apparatus, non-transitory computer readable medium, and system further include performing a diffusion process up to an intermediate timestep. Some examples further include performing a diffusion process starting from an intermediate timestep. In some aspects, the image generation model is trained using a training set including a source image depicting the first element and a reference image depicting the second element.

Training

Figure 8:
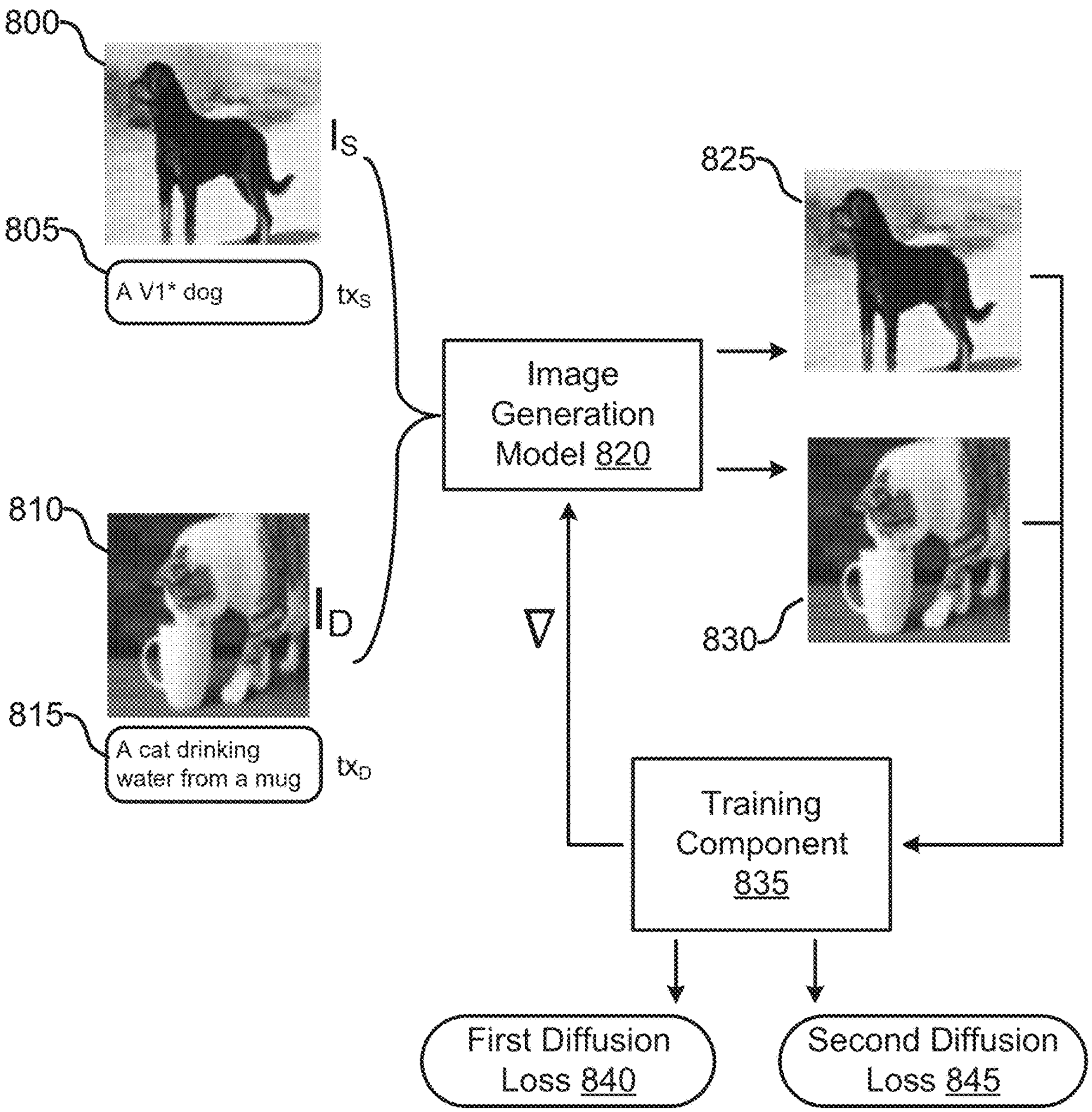
FIG. 8 shows an example of a training pipeline according to aspects of the present disclosure.

FIG. 8 shows an example of a training pipeline according to aspects of the present disclosure. The example shown includes source image 800, source caption 805, reference image 810, reference caption 815, image generation model 820, source image denoising prediction 825, reference image denoising prediction 830, training component 835, first diffusion loss 840, and second diffusion loss 845. Source image 800 is an example of, or includes aspects of, the corresponding element described with reference to FIG. 7. Image generation model 820 is an example of, or includes aspects of, the corresponding element described with reference to FIG. 2. Training component 835 is an example of, or includes aspects of, the corresponding element described with reference to FIG. 2.

According to some aspects, embodiments add knowledge to a pretrained image generation model by finetuning the model using a source image $I_S$ with source caption $tx_S$ and a reference image $I_D$ with reference caption $tx_D$. In an example, the finetuning process entails prompting image generation model 820 with source caption 805 to generate source image denoising prediction 825. Then, the training component 835 computes first diffusion loss 840 based on the differences between the generate source image denoising prediction 825 and the ground truth image, the source image 800. This process may be repeated to add knowledge about the reference image: image generation model 820 is prompted with reference caption 815 to generate reference image denoising prediction 830, and training component 835 then computes second diffusion loss 845 based on the differences from the prediction and reference image 810. Then, the training component updates the parameters of image generation model 820 using first diffusion loss 840 and second diffusion loss 845. For example, the training component may backpropagate the losses to update the parameters. Additional detail regarding training a guided latent diffusion model is provided with reference to FIG. 3 An example of the losses computed at each iteration during training is given by Equation 6:

$$\min_{\theta}\sum_{t=T}^{0}L(f(x_t, t, e_S, \theta), I_S),\ \min_{\theta}\sum_{t=T}^{0}L(f(x_t, t, e_D, \theta), I_D) \tag{6}$$

where the first expression represents the objective of minimizing the losses for the source image, and the second expression represents the objective of minimizing the losses for the reference image (sometimes referred to as a "driving image", hence the D in the notation), and θ are the parameters of the image generation model 820.

Figure 9:
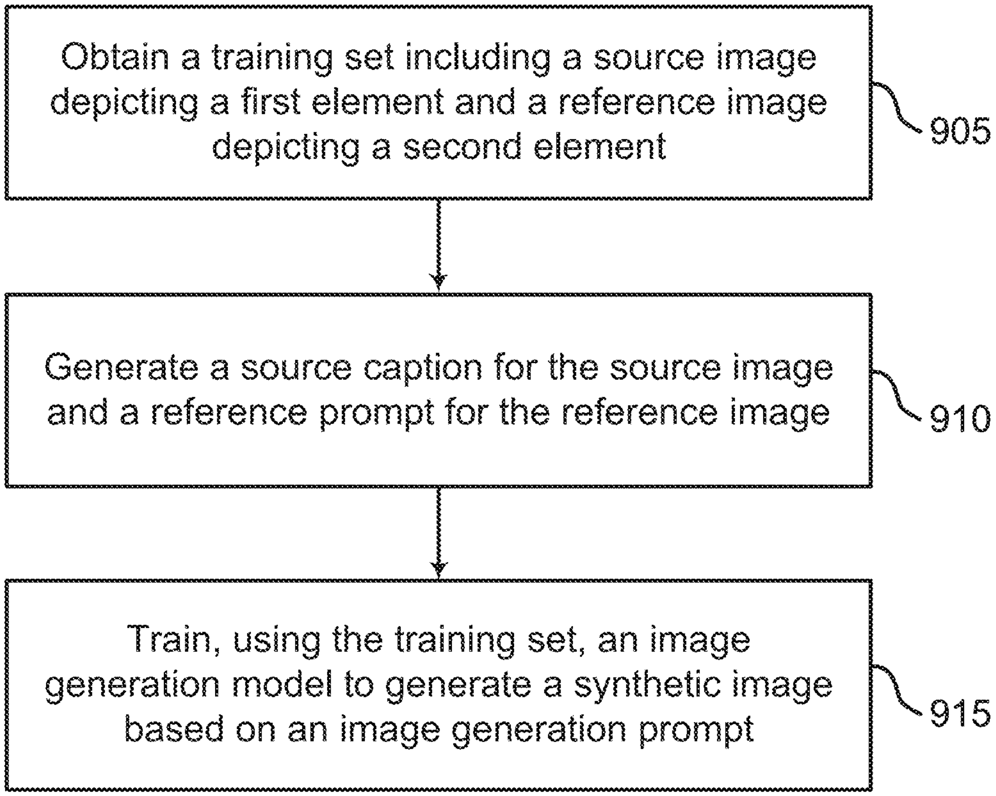
FIG. 9 shows an example of a method training a machine learning model according to aspects of the present disclosure.

FIG. 9 shows an example of a method 900 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a training set including a source image depicting a first element and a reference image depicting a second element. In some cases, the operations of this step refer to, or may be performed by, an image generation apparatus as described with reference to FIGS. 1 and 2. The first element may be, for example, a subject or actor. The second element may be, for example, an action or pose.

At operation 910, the system generates a source caption for the source image and a reference prompt for the reference image. In some cases, the operations of this step refer to, or may be performed by, a captioning component as described with reference to FIG. 2. The captioning component may be an image-to-text model configured to generate a description of an input image.

At operation 915, the system trains, using the training set, an image generation model to generate a synthetic image including the first element and the second element based on an image generation prompt that includes the first element and the second element and the reference prompt that includes the second element. According to some aspects, the training process entails adding incremental knowledge to the image generation model using a finetuning process, such as the one described with reference to FIG. 8. In this way, the image generation model is able to reference its prior knowledge of the various features of the first element and the second element during stepwise inference. Stepwise inference is described in detail with reference to FIG. 4.

Accordingly, embodiments include a method for training a machine learning model. One or more aspects of the method include obtaining a training set including a source image depicting a first element and a reference image depicting a second element and training, using the training set, an image generation model to generate a synthetic image including the first element and the second element based on an image generation prompt that includes the first element and the second element and a reference prompt that includes the second element.

In some aspects, the training set includes a source prompt describing the source image and a reference prompt describing the reference image. In some aspects, the image generation prompt comprises a nonce token corresponding to the first element.

Some examples of the method, apparatus, non-transitory computer readable medium, and system further include obtaining a pre-trained image generation model, wherein training the image generation model comprises finetuning the pre-trained image generation model based on the source image and the reference image. Some examples further include computing a first diffusion loss term based on the source image. Some examples further include computing a second diffusion loss term based on the reference image. Some examples further include updating parameters of the image generation model based on the first diffusion loss term and the second diffusion loss term.

Some examples of the method, apparatus, non-transitory computer readable medium, and system further include generating an amplitude guidance based on the source image. Some examples further include computing a phase guidance based on the reference image, wherein the generation of the synthetic image is based on the phase guidance and the amplitude guidance.

Figure 10:
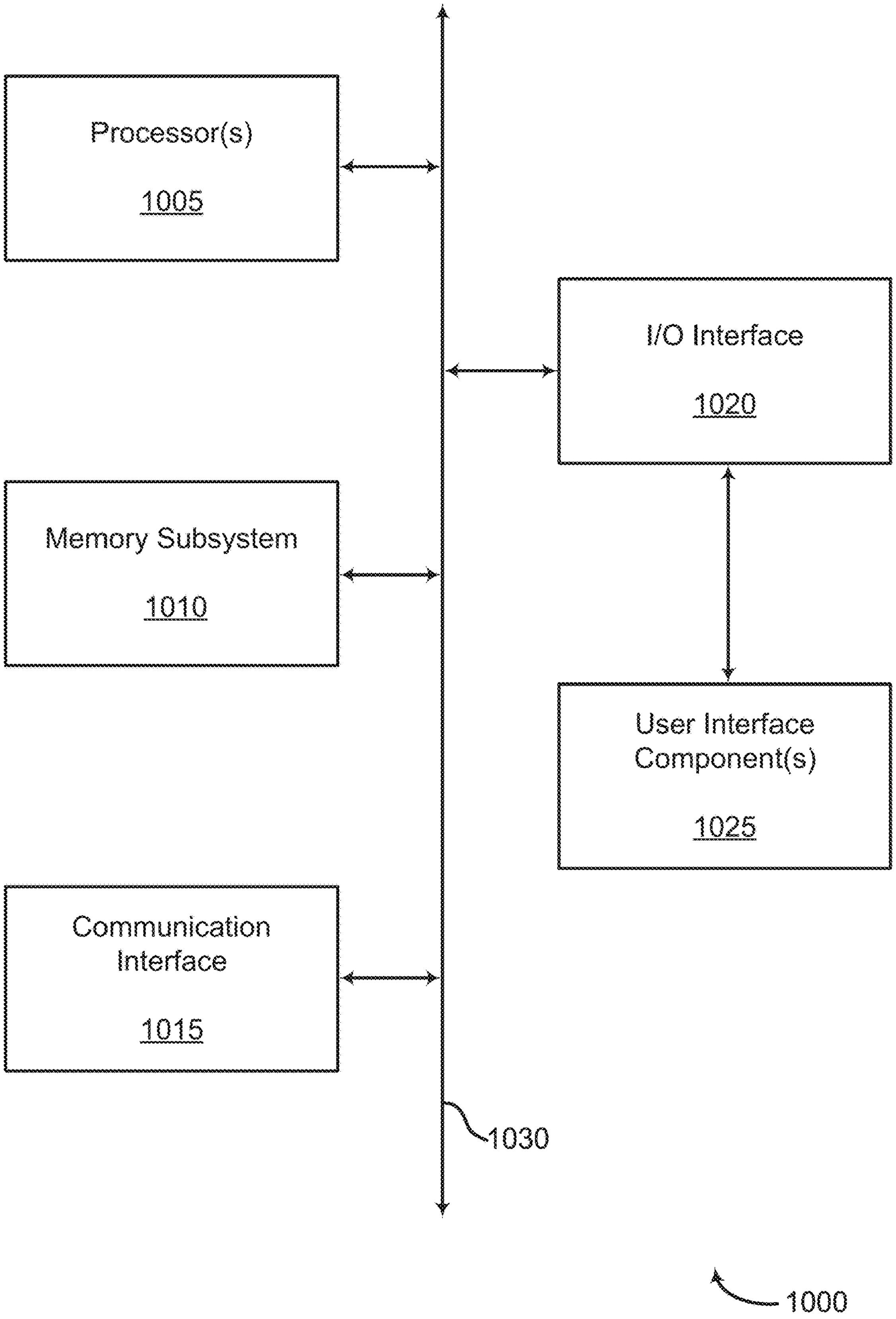
FIG. 10 shows an example of a computing device according to aspects of the present disclosure.

FIG. 10 shows an example of a computing device 1000 according to aspects of the present disclosure. The example shown includes computing device 1000, processor(s), memory subsystem 1010, communication interface 1015, I/O interface 1020, user interface component(s), and channel 1030.

In some embodiments, computing device 1000 is an example of, or includes aspects of, image generation apparatus 100 of FIG. 1. In some embodiments, computing device 1000 includes one or more processors 1005 that can execute instructions stored in memory subsystem 1010 to obtain an image generation prompt and a reference prompt, wherein the image generation prompt includes a first element and a second element, and the reference prompt includes the second element; generate, using an image generation model, an intermediate image based on the reference prompt; and generate, using the image generation model, a synthetic image including the first element and the second element based on the intermediate image and the image generation prompt.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an image generation prompt and a reference prompt, wherein the image generation prompt includes a first element and a second element, and the reference prompt includes the second element;

generating, using an image generation model, an intermediate image based on the reference prompt, wherein the intermediate image is based on a partial denoising of a noise sample up to an intermediate timestep using the reference prompt as guidance; and generating, using the image generation model, a synthetic image including the first element and the second element based on the intermediate image and the image generation prompt, wherein the synthetic image is generated by further denoising the intermediate image starting from the intermediate timestep using the image generation prompt as guidance.

2. The method of claim 1, wherein:

the first element comprises a subject and the second element an action performed by the subject.

3. The method of claim 1, wherein:

the image generation prompt comprises a nonce token corresponding to the first element.

4. The method of claim 1, further comprising:

obtaining a source image depicting the first element; and generating an amplitude guidance based on the source image, wherein the synthetic image is generated based on the phase guidance.

5. The method of claim 1, further comprising:

obtaining a reference image depicting the second element; and generating a phase guidance based on the reference image, wherein the intermediate image is generated based on the phase guidance.

6. The method of claim 1, further comprising:

computing a Fourier transform of a latent space representation of a source image depicting the first element to obtain amplitude information of the source image, wherein the synthetic image is generated based on the amplitude information of the source image.

7. The method of claim 1, wherein generating the synthetic image comprises:

computing an inverse Fourier transform of a magnitude of a Fourier transform of a latent space representation of a source image depicting the first element to obtain an amplitude guidance, wherein the synthetic image is generated based on the amplitude guidance.

8. The method of claim 1, wherein:

the image generation model is trained using a training set including a source image depicting the first element and a reference image depicting the second element.

9. A method of training a machine learning model, the method comprising:

obtaining a training set including a source image depicting a first element and a reference image depicting a second element; and training, using the training set, an image generation model to generate a synthetic image including the first element and the second element based on an image generation prompt that includes the first element and the second element and a reference prompt that includes the second element, wherein the image generation model is trained to generate the synthetic image using a first diffusion loss based on the source image and a second diffusion loss based on the reference image.

10. The method of claim 9, wherein:

the training set includes a source prompt describing the source image and a reference prompt describing the reference image.

11. The method of claim 9, wherein:

the image generation prompt comprises a nonce token corresponding to the first element.

12. The method of claim 9, further comprising:

obtaining a pre-trained image generation model, wherein training the image generation model comprises fine-tuning the pre-trained image generation model based on the source image and the reference image.

13. The method of claim 9, wherein training the image generation model comprises:

prompting the image generation model with a source caption to generate a source image denoising prediction, wherein the first diffusion loss is based on a difference between the source image denoising prediction and the source image; and prompting the image generation model with a reference caption to generate a reference image denoising prediction, wherein the second diffusion loss is based on a difference between the reference image denoising prediction and the reference image.

14. The method of claim 9, further comprising:

generating an amplitude guidance based on the source image; and computing a phase guidance based on the reference image, wherein the generation of the synthetic image is based on the phase guidance and the amplitude guidance.

15. An apparatus comprising:

at least one processor;

at least one memory including instructions executable by the at least one processor; and the apparatus further comprising an image generation model comprising parameters stored in the at least one memory and configured to:

generate an intermediate image based on a partial denoising of a noise sample up to an intermediate timestep, and generate a synthetic image including a first element and a second element based on an image generation prompt that includes the first element and the second element and a reference prompt that includes the second element, wherein the intermediate image is generated using the reference prompt as guidance, and wherein the synthetic image is generated by further denoising the intermediate image starting from the intermediate timestep.

16. The apparatus of claim 15, wherein:

the image generation model comprises a diffusion model.

17. The apparatus of claim 15, further comprising:

a text encoder configured to generate a text embedding of the image generation prompt and the reference prompt.

18. The apparatus of claim 15, further comprising:

a guidance component configured to generate a phase guidance and an amplitude guidance.

19. The apparatus of claim 15, wherein:

the image generation prompt comprises a nonce token corresponding to the first element.

* * * * *